June 28, 1966  R. N. DIGNARD  3,257,725
HOT DOG SLITTER
Filed April 13, 1964
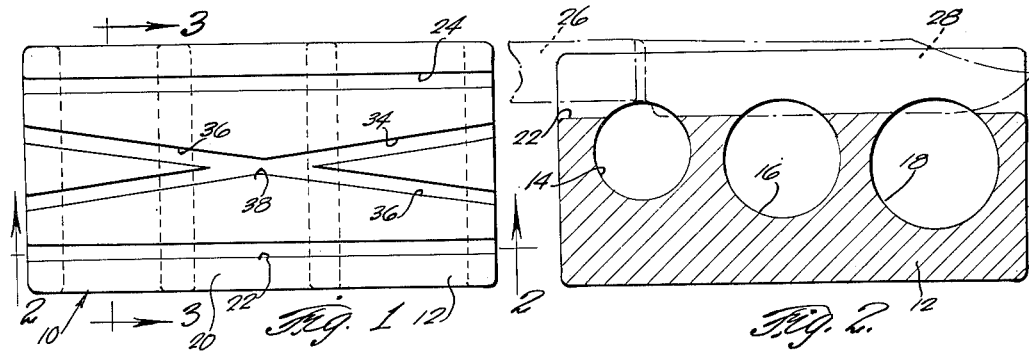
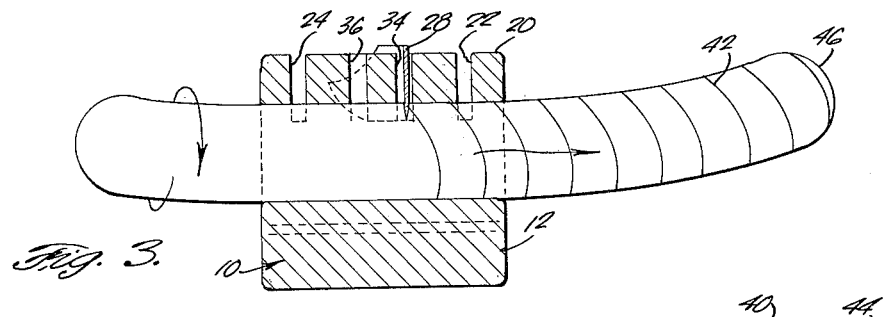
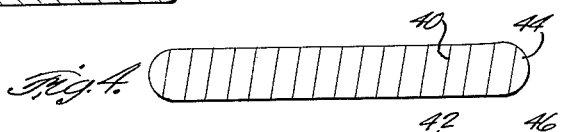
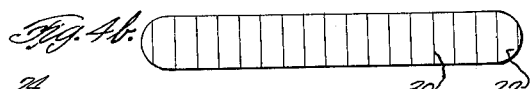
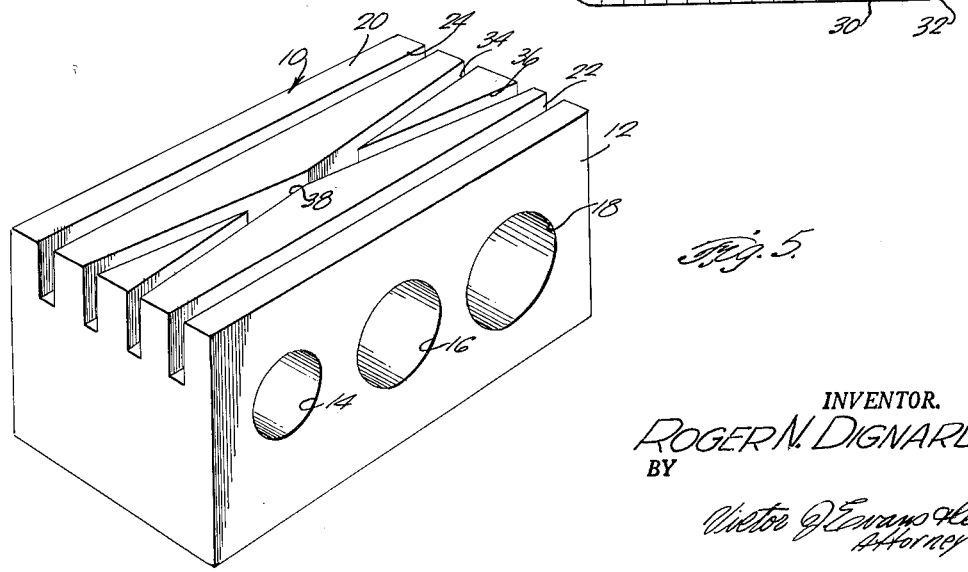
INVENTOR.
ROGER N. DIGNARD
BY
Victor J. Evans & Co.
Attorneys

3,257,725
HOT DOG SLITTER
Roger N. Dignard, Berlin, N.H.
Filed Apr. 13, 1964, Ser. No. 359,062
5 Claims. (Cl. 30—290)

The present invention generally relates to an implement for slitting the periphery of a hot dog when a conventional knife is used in combination therewith.

The invention particularly relates to an implement for slitting peripheral portions of a hot dog or the like, including a block having a series of slots or grooves forming a configuration of IXI, or a combination thereof, in which a knife may be inserted, and a series of elongated holes extending through the block transversely of the slots, so that when a hot dog is inserted, a cut is performed on the hot dog by said knife.

Previously devices for forming slits in hot dogs have involved the use of permanently mounted blades extending into a longitudinal bore for forming one or more longitudinal slits in a hot dog when forced through the bore. Such previously known devices are restricted in their use to hot dogs of one diameter and can only form longitudinal slits. Accordingly, it is the main object of the present invention to provide a hot dog slitter which will form spiral slits or longitudinally spaced annular slits in a hot dog by using a block like body of special construction combined with a conventional sharp knife.

Another object of the present invention is to provide a hot dog slitter which is constructed in such a way as to effectively slit hot dogs of different diameters.

A further object of the invention is to provide a hot dog slitter that is simple in construction, easy to use, easy to clean, safe in operation and relatively inexpensive to manufacture.

These and other objects of the present invention will be more fully realized and understood from the following detailed description when taken in conjunction with the accompanying drawings wherein:

FIGURE 1 is a top plan view of the hot dog slitter of the present invention;

FIGURE 2 is a sectional view taken along the plane of section line 2—2 of FIGURE 1;

FIGURE 3 is a sectional view taken along section line 3—3 of FIGURE 1 illustrating the operation of the invention;

FIGURES 4, 4a and 4b illustrate, in elevation, the types of slits that can be formed in a hot dog; and FIGURE 5 is a perspective view of the hot dog slitter body or block.

Referring now to the drawings, the hot dog slitter 10 is illustrated in form of a block or body 12 of metal, plastic or wood in the shape of a parallelepiped block having three bores or passageways 14, 16 18 located therein in parallel relation. The bore 14 is smaller than bore 16 which in turn is smaller than bore 18 as will be clear from observing FIGURE 2. The top surface 20 of the block 12 is provided with a pair of grooves 22 and 24 paralleling the long edges of the block 12 and having bottoms which communicate with the bores 14, 16 and 18 as illustrated in FIGURES 2 and 3.

A conventional knife 26 having a thin sharpened blade 28 is disposed in one of the grooves 22 or 24 for forming annular slits 30 in a hot dog 32 as seen in FIGURE 4b.

The top surface 20 is also provided with a pair of diagonal grooves 34 and 36 which intersect at a central open area 38. The grooves 36 and 38 also communicate with the bores 14, 16 and 18 and are adapted to form either a left hand or right hand slit 40 or 42 in hot dogs 44 and 46 as a hot dog is twisted through the proper bore with the sharp edge of the knife blade cutting into the hot dog at predetermined depth for making the hot dogs fancier as well as enabling sauces and the like to more effectively enter the interior of the hot dog when the hot dog is being cooked.

The bores 14, 16 and 18 are preferably of a diameter of ¾", ⅞" and 1" respectively to receive different diameter hot dogs and the knife blade extends into the respective bores for about ⅛" in order to form a slit of approximately that depth. This may be accomplished by locating the bores ⅜" from the top surface 20 and making the grooves ½" deep. Also, the included angle between the grooves 34 and 36 should range from approximately 10 degrees to approximately 12 degrees to orientate the knife blade 28 properly when twisting and advancing the hot dog in relation to the block 12. Of course, slight downward pressure exerted on the knife will also keep the block in place when slitting the hot dog. Also, the knife may be used for conventional purposes thus reducing the cost of the slitting device and also the knife can be easily sharpened when necessary.

The principle of the invention explained in connection with the specific exemplifications thereon will suggest many other applications and modifications of the same. It is accordingly desired that, in construing the breadth of the appended claims they shall not be limited to the specific details shown and described in connection with the exemplifications thereof.

What is claimed is:

1. A hot dog slitter comprising a block body having a series of bores generally parallel extending therethrough each for receiving a hot dog, said block body including a series of grooves disposed in transverse angular relation to the axis of the bores and communicating with the periphery of each of the series of bores, so that as the grooves receive a knife blade it slits the hot dog during movement of the hot dog in the bore.

2. The hot dog slitter as defined in claim 1 wherein said grooves are normal to the longitudinal axis of the bores to form annular slits in a hot dog during rotation of the hot dog in one of the bores.

3. The hot dog slitter as defined in claim 1 wherein said grooves are in acute angular relation to the longitudinal axis of the bores for forming spiral slits in the hot dog during rotation and lengthwise movement of the hot dog through one of the bores.

4. The hot dog slitter as defined in claim 1 wherein the grooves extend into intersecting relation to the bores for a predetermined distance thereby limiting the depth of the slit formed in the hot dog.

5. The hot dog slitter as defined in claim 1 wherein said body has at least one additional bore extending therethrough and communicating with said groove, said additional bore having a different cross-sectional area for receiving different sizes of hot dogs.

References Cited by the Examiner

UNITED STATES PATENTS

| 1,462,717 | 7/1923 | Maus. | |
| 2,675,580 | 4/1954 | Pesce. | |
| 2,782,787 | 2/1957 | Cary | 146—170 X |
| 2,807,267 | 9/1957 | Walker | 146—170 X |
| 3,161,088 | 12/1964 | Tolman. | |

WILLIAM FELDMAN, *Primary Examiner.*

JAMES L. JONES, JR., *Examiner.*